US012617958B2

(12) United States Patent
Illsley

(10) Patent No.: US 12,617,958 B2
(45) Date of Patent: May 5, 2026

(54) AQUEOUS INK COMPOSITIONS

(71) Applicant: SUN CHEMICAL CORPORATION, Parsippany, NJ (US)

(72) Inventor: Derek Illsley, North East Somerset (GB)

(73) Assignee: SUN CHEMICAL B.V., Weesp (NL)

( * ) Notice: Subject to any disclaimer, the term of this patent is extended or adjusted under 35 U.S.C. 154(b) by 762 days.

(21) Appl. No.: 18/017,931

(22) PCT Filed: Oct. 6, 2021

(86) PCT No.: PCT/GB2021/052578
§ 371 (c)(1),
(2) Date: Jan. 25, 2023

(87) PCT Pub. No.: WO2022/079414
PCT Pub. Date: Apr. 21, 2022

(65) Prior Publication Data
US 2023/0295448 A1 Sep. 21, 2023

Related U.S. Application Data

(60) Provisional application No. 63/091,377, filed on Oct. 14, 2020.

(51) Int. Cl.
| | |
|---|---|
| *C09D 11/02* | (2014.01) |
| *C09D 5/02* | (2006.01) |
| *C09D 11/023* | (2014.01) |
| *C09D 11/03* | (2014.01) |
| *C09D 11/107* | (2014.01) |
| *C09D 11/30* | (2014.01) |
| *C09D 11/38* | (2014.01) |

(52) U.S. Cl.
CPC ............ *C09D 11/107* (2013.01); *C09D 5/028* (2013.01); *C09D 11/03* (2013.01); *C09D 11/38* (2013.01)

(58) Field of Classification Search
None
See application file for complete search history.

(56) References Cited

U.S. PATENT DOCUMENTS

| | | | |
|---|---|---|---|
| 7,338,988 B2 | 3/2008 | Hesler | |
| 7,354,476 B2 | 4/2008 | Beach et al. | |
| 7,638,561 B2 | 12/2009 | Fu et al. | |
| 9,249,324 B2 | 2/2016 | Li et al. | |
| 10,076,909 B2 | 9/2018 | Gould et al. | |
| 10,513,622 B2 | 12/2019 | Falkner et al. | |
| 2007/0109375 A1 | 5/2007 | Yamauchi et al. | |
| 2014/0037913 A1* | 2/2014 | Nagahama | C09D 175/04 |
| | | | 428/195.1 |
| 2017/0029639 A1 | 2/2017 | Loccufier et al. | |
| 2017/0218565 A1 | 8/2017 | Loccufier | |
| 2018/0105710 A1 | 4/2018 | Hong | |
| 2019/0106587 A1 | 4/2019 | Kuykendall et al. | |
| 2020/0040205 A1* | 2/2020 | Hong | C09D 11/00 |

FOREIGN PATENT DOCUMENTS

| | | |
|---|---|---|
| CN | 108 912 984 A | 11/2018 |
| CN | 110982344 | 4/2020 |
| EP | 3390545 | 3/2021 |
| JP | 2002294112 | 10/2002 |
| JP | 2004149600 | 5/2004 |
| JP | 2006045334 | 2/2006 |
| JP | 2006264228 | 10/2006 |
| JP | 2009149774 | 7/2009 |
| JP | 2012241135 | 12/2012 |
| JP | 2015093954 | 5/2015 |
| WO | WO2001036547 | 5/2001 |
| WO | WO2009/137753 | 11/2009 |
| WO | WO201717498 | 2/2017 |
| WO | WO2017021278 | 2/2017 |
| WO | WO2018138525 | 8/2018 |
| WO | WO2018138720 | 8/2018 |
| WO | WO2019074683 | 4/2019 |
| WO | WO2020102788 | 5/2020 |

OTHER PUBLICATIONS

Machine translation of CN 108912984 A (no date).*
International Search Report issued in International Application No. PCT/GB2021/052578, mailed Dec. 20, 2021.
Written Opinion of the International Searching Authority issued in International Application No. PCT/GB2021/052578, mailed Dec. 20, 2021.
International Preliminary Report on Patentability (Chapter 1 of the Patent Cooperation Treaty) issued in International Application No. PCT/GB2021/052578, mailed Jan. 10, 2023.
N.Kessel et. al. (J.Coat.Technol.Res. (2008), (5), 285).

* cited by examiner

*Primary Examiner* — Michael J Feely

(57) ABSTRACT

Curable aqueous printing ink compositions, especially ink-jet, having excellent resolubility, comprising self-crosslink-able styrene-acrylic polymer dispersions and hydroxy-functional PUDs.

25 Claims, No Drawings

AQUEOUS INK COMPOSITIONS

CROSS REFERENCE TO RELATED APPLICATIONS

The present application is a § 371 National Phase application based on PCT/GB2021/052578 filed Oct. 6, 2021, which claims the benefit of U.S. Provisional Application No. 63/091,377 filed Oct. 14, 2020, the subject matter of each of which is incorporated by reference in their entirety.

The present invention relates to aqueous ink compositions and methods of preparing them, as well as methods of printing such compositions and printed articles produced thereby. The present invention particularly relates to inkjet printing and inkjet printing ink. The present invention particularly relates to resoluble, yet crosslinkable aqueous ink compositions, especially inkjet but also other types of inks such as for example aqueous flexographic and gravure printing inks. The inks of the present invention represent a significant advance for ink technology, especially inkjet ink technology, and especially for inks where the amount of humectant co-solvent needs to be restricted to enable faster single pass printing. The inventors have shown that inks prepared according to the present invention show excellent stability, showing very little change in viscosity or pH when stored at 50° C., for 2 weeks. This is an especially advantageous feature for inkjet printing where any changes in viscosity can be detrimental to the printing (jetting) quality. A further benefit of this stable ink technology is that when the inks partially or fully dry at temperatures used in printing (typically up to 40° C.) the inks can be re-dissolved quite readily, reducing the risk of irreversibly blocking printheads.

The use of self-crosslinking styrene-acrylic dispersions in conventional, analogue, printing processes is well known. A good overview of the keto-amine chemistry of this type of polymer dispersion is provided by N. Kessel et. al. (J. Coat. Technol. Res. (2008), (5), 285). The polymer contains ketone, or aldehyde, groups as part of its molecular structure which can then react, upon drying, with multifunctional primary (or secondary) amines to affect the crosslinking reaction. A typical multifunctional amine used in self-crosslinking styrene-acrylic emulsions is adipic dihydrazide, although any other multifunctional amine that can react with either carbonyl or aldehyde groups may also be used.

Polyurethane dispersions (PUDs) are seemingly the predominant resin chemistry used in the preparation of pigmented aqueous inkjet printing inks. There are a number of instances in the prior art of the use of amino resins, such as melamine-formaldehydes, to crosslink aqueous inkjet printing inks containing PUDs, especially in the printing of textiles. WO2009/137753 describes how PUDs can be crosslinked with Cymel 303, a melamine-formaldehyde crosslinker, at a temperature of 160° C. A number of other patents describe the use of optional crosslinkers in combination with PUDs to enable improved resistance properties, including; WO2019074683, US20190106587, U.S. Pat. No. 10,513,622, JP2002294112. U.S. Pat. No. 9,249,324, which discloses polyurethane pigment dispersants, usefully lays out the crosslinking possibilities for polyurethanes having any of carboxylic acid, hydroxyl or amine pendant functional groups. Crosslinkers include carbodiimides, epoxies, isocyanates, amino resins (e.g. melamine-formaldehyde), aziridines. However, these references do not disclose the use of self-crosslinking styrene-acrylic dispersions (or solutions), nor their combination with hydroxyl-functional PUDs to deliver a resoluble, yet crosslinkable inkjet technology.

US20170029639 and US20170218565 describe the preparation of encapsulated resin particles, where the capsules may comprise compositions which are thermally curable. Again, various conventional crosslinking chemistries are disclosed including; ketone-hydrazine, epoxy-amine, melamine-formaldehyde, with a preference for the use of blocked isocyanates. Again, no reference to the preferential use of hydroxyl-functional PUDs to promote the resolubility of the inks is disclosed.

WO2017021278 describes composite resin particles comprising low molecular weight conventional crosslinkers, such as epoxies, oxetanes, aziridines, amino resins (such as melamine-formaldehydes) and blocked isocyanates, where the molecular weight of the crosslinker is preferably less than 2000 Daltons.

WO2020102788 discloses aqueous inkjet printing inks comprising carboxylic acid functional acrylic resins which may be crosslinked with well-known, conventional, crosslinkers such as polycarbodiimides, polyoxazolines, aziridines, melamine-formaldehydes, ammonium zirconium carbonate. Again, no mention of the use of self-crosslinking styrene-acrylic dispersions was made.

It should be understood that the present invention may optionally use crosslinking agents as disclosed in the prior art. Thus, the aqueous inkjet compositions of the present invention may comprise hydroxyl-functional PUDs and self-crosslinking styrene-acrylic dispersions (the terms 'emulsion' or 'latex' are often used in place of dispersion), along with any crosslinker, such as for example polycarbodiimide, polyoxazoline, polyaziridine, a metal complex crosslinker (including titanate and zirconate organometallics, such as ammonium zirconium carbonate) amino resin (e.g. melamine-formaldehyde), blocked isocyanate, epoxy crosslinker, etc.

Aqueous inkjet compositions comprising (meth)acrylic copolymer dispersions are also well known. U.S. Pat. Nos. 7,338,988, 7,638,561, 7,354,476 describe aqueous inkjet compositions comprising acrylic dispersions having a $T_g$ in the range −40 to 150° C. U.S. Pat. No. 7,638,561 and JP2015093954 describe the use of core-shell acrylic dispersions.

Recently, the use of acrylated polyurethane dispersions ('Ac-PUDs') in the preparation of UV-, and EB-curable aqueous inkjet printing compositions has been disclosed quite widely, for example in U.S. Pat. No. 10,076,909, EP3390545, WO2017174981 and WO2018138525. The crosslinking of these Ac-PUDs is induced by the use of a suitable photoinitiator in the case of UV-curing. In principle, such compositions will have excellent stability since crosslinking can only be affected in the presence of intense UV light or EB radiation once the ink composition has been partially or fully dried after printing. However, the use of photoinitiators can pose a risk of unwanted migration of low molecular weight compounds from a cured ink, which would be undesirable in many applications, especially the printing of food packaging. Furthermore, Ac-PUDs can be prone to hydrolysis of the acrylate groups, resulting in the liberation of acrylic acid causing potential pH instability issues, again undesirable for inkjet printing.

A number of references describe the use of self-crosslinking styrene-acrylic dispersions in the preparation of aqueous inkjet ink compositions, but none of the identified prior art discloses the beneficial use of hydroxyl-functional PUDs in combination with such dispersions. WO2001036547 describes compositions comprising self-crosslinkable polymer (or oligomer) emulsions containing carbonyl groups as part of the polymeric structure, which can crosslink with adipic dihydrazide, for instance. The compositions further comprise what is referred to as a "resolubilizing polymer", such as a water-soluble acrylic polymer. The inventors have found that such compositions, although delivering excellent print resistance, have very poor resolubility when tested in the manner detailed by way of the examples. Certainly, the innate resolubility achieved with hydroxyl-functional PUDs, as disclosed herein, is a highly beneficial aspect of the invention.

JP2006045334, JP2004149600, JP2009149774 and JP2012241135 also describe aqueous inkjet ink composi- tions comprising self-crosslinking styrene-acrylic disper- sions, but again without reference to the beneficial use in combination with hydroxyl-functional PUDs to promote the ink resolubility.

CN110982344 discloses white aqueous inkjet ink com- positions comprising self-crosslinking acrylic emulsions, along with a PUD and also a further crosslinker, such as a blocked isocyanate. This prior art fails to disclose or allude to the benefit arising from the use of hydroxyl-functional PUDs.

WO2018138720 describes crosslinkable inkjet composi- tions which may comprise a silane-functional self-crosslink- ing PUD. JP2006264228 and US20070109375 disclose inks comprising acetoacetate-functional poly(vinyl alcohol)s which may crosslink with multifunctional amines (including dihydrazides).

The literature (and that which is understood by the inventors to be currently practiced commercially) has not satisfactorily described how to achieve resoluble aqueous inkjet ink compositions comprising self-crosslinkable sty- rene-acrylic polymer dispersions, which at the same time deliver prints that can cure at temperatures of 100° C. or less, even at room temperature, after the prints have been dried. This is especially the case for inks prepared according to the invention, which are intended for single pass inkjet printing, with concentrations of co-solvents such as propylene glycol of 30% (w/w), or less. The key feature of the invention in achieving this has been to combine self-crosslinkable sty- rene-acrylic polymer dispersions (or aqueous solution poly- mers) with hydroxyl-functional PUDs, believed to be the first reported instance of this approach, not just for inkjet applications but more broadly for other ink types. Thus, the invention although directed primarily towards inkjet also finds utility in other printing and coating applications, including flexographic printing.

The resolubility of the compositions can be further enhanced by the optional use of amines having boiling points in the preferred range of 130 to 250° C. and yet more preferably in the range 130 to 200° C. Such amines not only promote the resolubility of the inks, they still allow prints to cure after being dried or heated at temperatures of 100° C., or less. This is not the case with involatile amines such as triethanolamine, which is a commonly used amine in the art.

To summarize, the key advantages of the inventive tech- nology are:

1. Highly resoluble inks, which will help prevent any irreversible drying in a printhead.
2. Crosslinkable inks which allow prints to cure at tem- peratures of less than 100° C., after drying. Indeed, the inventors have shown that prints of the inventive com- positions can cure at room temperature, reaching an excellent state of water resistance after one to four days.
3. Inks with excellent storage stability. Compositions prepared according to the invention show excellent viscosity and pH stability when stored at 50° C.

Citation or identification of any document in this appli- cation is not an admission that such represents prior art to the present invention.

DETAILED DESCRIPTION

According to the present invention, there is provided curable aqueous inkjet printing ink compositions, having excellent resolubility, comprising self-crosslinkable styrene- acrylic polymer dispersions and hydroxy-functional PUDs.

The invention resides in the finding that aqueous printing inks having excellent resolubility/redispersibility but with the capacity to cure after printing to produce water resistant prints can be prepared by combining a self-crosslinking styrene-acrylic dispersion or solution polymer ('SCSA') with a hydroxyl-functional polyurethane dispersion ('OH- PUD'). The use of the OH-PUD confers the resolubility/ redispersibility of the inks, which is an especially useful feature for aqueous inkjet printing inks. Resolubility/redis- persibility, in the context of this invention and inkjet more broadly, can be described as the ability of an ink drying at temperatures up to 40, and even 50° C., for periods up to one hour, to re-dissolve, or redisperse, into itself or a suitable 'flushing' solution. Without the OH-PUD, SCSAs have poor resolubility/redispersibility, as will be shown by way of the examples. For inkjet printing, the invention is exceptionally advantageous as the good resolubility helps to prevent the irreversible drying of inks in a printhead. If such irreversible drying of an ink in a printhead occurred it could lead to blocked nozzles and a consequent loss in print quality performance or, even worse, the loss of the printhead itself. So, it can be seen that an ideal solution for an inkjet printing ink would be one that has good resolubility (with advantages of open time) yet at the same time being able to cure after printing and drying to produce water resistant prints, espe- cially at temperatures of 100° C., or less. The invention achieves this without recourse to the use of excessive concentrations of high boiling point co-solvents such as glycerol and propylene glycol. For the purposes of this application, a high boiling solvent has a boiling point of at least 250° C. (under a standard pressure of 100 kPa). Indeed, the inventive inks maintain good resolubility/redispersibility with propylene glycol concentrations as low as 30%, such as 25%, or 15% (w/w) of the ink composition. Thus, a further aspect of the invention is that the concentration of organic co-solvents should preferably be 30% or less, such as less than 30%, and more preferably 25% (w/w) or less of the total ink composition. Where such co-solvents are used, then any combination of solvents having boiling points of greater than 200° C. should preferably be less than 10% (w/w) of the ink composition.

The inventors have also found that the resolubility of the inks can be further enhanced by using amines having boiling points greater than 130° C. However, if amines with boiling points greater than 250° C. are used, such as trietha- nolamine, although improved ink resolubility is achieved, the cure of the printed inks can be adversely affected. However, where amines with boiling points of less than 250° C. are used, such as N,N'-dimethylethanolamine, N-methy- lethanolamine, 2-Amino-2-methyl-1-propanol and N-meth- yldiethanolamine, not only is the resolubility enhanced but the cure of dried prints develops much more rapidly than triethanolamine, for example. The amines can be introduced to the inks either as an additive to the ink, or by using the amines in the neutralisation of the SCSAs and OH-PUDs of the invention. The inventors have found that neutralising an SCSA with such an amine can be effective in improving the resolubility of an ink.

The SCSAs of the invention may use any self-crosslinking chemistry as described previously, including the well-known keto-dihydrazide chemistry; as well as self-condensation of polymers comprising N-methylol functionality; the crosslinking of polymers comprising carboxylic acid or carbonyl groups with metal complex crosslinking agents; and self-condensation of polymers comprising organosilane functionality. The keto-dihydrazide crosslinking chemistry is well established and is used in a number of applications, including waterbased flexographic printing inks. Furthermore, there is a large number of commercial grades which are suitable for the printing of food packaging. The issue with using SCSAs by themselves in the preparation of aqueous inkjet ink compositions is that when they are dried at temperatures up to 40° C., for an hour, they become largely insoluble in either the ink itself or a flushing solution. It is the introduction of the OH-PUD which helps to improve the resolubility/redispersibility of the inks whilst allowing them to cure, after printing and drying, to produce water resistant prints. Contrariwise, OH-PUDs, especially those having preferred hydroxyl values of greater than 50 mgKOH/g, can produce inks having excellent resolubility/ redispersibility, but which generally produce dried prints with poor water resistance. It is the novel combination of OH-PUDs and SCSAs that can produce aqueous printing inks, especially aqueous inkjet printing inks, with a desirable combination of resolubility/redispersibility and cure of a dried print.

After printing and drying, the inks of the invention can develop their cure at ambient or elevated temperatures. The inventors have found that at ambient conditions the cure of the inks can develop for a day or more after printing. The cure of the inks can be accelerated by heating the prints at temperatures of 50° C., or greater. Prints of inks prepared according to the invention can achieve excellent water resistance when heated to temperatures of 100° C., or less.

The inkjet printing inks of the invention may be used in any application including, but not limited to; packaging printing (flexible, cartonboard and corrugated); metal decoration printing (including metal can packaging); textiles printing; and décor printing.

As well as monomers comprising the crosslinking function; whether that be aldehyde, ketone, carboxylic acid, methylol or silane group, the SCSAs of the invention may further comprise any of the following, non-limiting monomers in their preparation; styrene, methyl-styrene, methyl acrylate, methyl methacrylate, ethyl acrylate, ethyl methacrylate, butyl acrylate, butyl methacrylate, hexyl acrylate, hexyl methacrylate, ethylhexyl acrylate, ethylhexyl methacrylate, or any ester of acrylic or methacrylic acid, acrylic acid, methacrylic acid, itaconic acid, maleic anhydride, styrene sulphonic acid and its salts, 2-Acrylamido-2-methylpropane sulfonic acid and its salts, vinyl acetate, any acrylamide or methacrylamide monomer. It should be noted, however, that the invention covers any aqueous self-crosslinking styrene-acrylic polymer. It is the combination with the OH-PUD and optional amine of the invention which is key in delivering resoluble inks, especially for inkjet printing.

The hydroxyl-functional polyurethane dispersion ('OH-PUD') may have a hydroxyl value, based on the dry weight of the polymer, of at least mgKOH/g, such as at least 20 mgKOH/g, at least 25 mgKOH/g, or at least 30 mgKOH/g, and preferably 50 mgKOH/g or greater. For example, the OH-PUD may preferably have a hydroxyl value, based on the dry weight of the polymer, of 70 mgKOH/g or greater, such as 90 mgKOH/g or greater, 110 mgKOH/g or greater, 130 mgKOH/g or greater, 150 mgKOH/g or greater, or 170 mgKOH/g or greater. Such PUDs may be prepared by methods well known to those skilled in the art, and the high hydroxyl values of the PUD may be achieved by using an excess of diol, compared to diisocyanate in the polyurethane preparation or by using chain terminating species such as ethanolamine and diethanolamine to end-cap the polyurethane. For the purposes of the current invention it is not important how the OH-PUD is prepared other than that it enables a resoluble/redispersible ink to be prepared. Furthermore, there is no restriction on whether the OH-PUD is anionically or non-ionically stabilized. In the first case, the OH-PUD comprises acid groups as part of its polymeric structure which, after neutralization with a suitable base, confer the anionic stabilization mechanism enabling its dispersion. In the case of non-ionically stabilized PUDs it is usual to incorporate a hydrophilic segment as part of the polyurethane dispersion (such as a poly(ethylene oxide)) to enable its dispersion. Where the PUDs are anionically stabilized it is preferred that the acid value, based on the dry polymer weight, should be at least 10, and more preferably at least 20 mgKOH/g. Dispersion of OH-PUDs may also be promoted by the use of anionic and non-ionic surfactants.

There is no particular restriction on the total solid content contributed by the OH-PUD and SCSA to the final aqueous inkjet printing ink composition. However, it is preferred that the total solid content contributed by both components to the final ink formulation should be in the range 2.5% (w/w) to 30% (w/w), and more preferably in the range 5.0% (w/w) to 20.0% (w/w) of the final ink composition, based on the dry polymer weight.

There is no particular restriction on the ratio of the SCSA to the OH-PUD, based on dry weight. However, it is preferred that this ratio should be in the range 10:1 to 1:10 and more preferably in the range 8:2 to 2:8.

The aqueous inkjet printing inks of the invention preferably have viscosities, at 32° C., of less than 10.0 mPa·s. Unless stated otherwise, the viscosities of the inks were measured using a Brookfield DV-II+ Pro Viscometer equipped with Spindle no. 18, 100 rpm, 32° C.

The pH of the inks should preferably be in the range 5.0 to 10.0 and more preferably in the range 6.0 to 9.5.

The inks of the invention may optionally comprise any additional crosslinker, including but not limited to those comprising the following reactive species; carbodiimides, oxazolines, aziridines, epoxies, amino resins (such as melamine-formaldehydes), metal complexes (including titanate and zirconate organometallics, such as ammonium zirconium carbonate), isocyanates (including blocked isocyanates), epoxies.

A further, optional, feature of the invention is that where any water-soluble organic solvent is used, it should preferably have a boiling point of less than 250° C., and more preferably less than 200° C. Where solvents with boiling points of greater than 250° C. are used their concentration in the ink should preferably be less than 10.0% (w/w) and more preferably less than 5.0% (w/w). The total concentration of water-soluble organic solvents should preferably be less than 35.0% (w/w), and more preferably less than 30.0% (w/w) of the ink composition, such as 25.0% (w/w) or less.

The inks of the invention may be printed via multipass or single pass inkjet printing processes, terms which are well understood in the industry. The inks are particularly advantageous in single pass inkjet printing.

The inks of the invention may be printed onto any suitable substrate, either unprimed or which has previously been pre-coated with a suitable primer composition to enhance the print quality. Such primers typically comprise a multivalent metal salt which helps to 'fix' the ink, reducing print quality issues such as drop spread and intercolour bleed. It should be understood that although primers do not form a key part of the invention any suitable primer enhancing the print quality achievable with the inventive inks may be used.

The printing ink compositions may further optionally include an amine having a boiling point preferably greater than 130° C., but less than 250° C., such as less than 220° C., less than 200° C., or less than 180° C.

After printing and drying the inks of the invention, they can cure at room temperature or at elevated temperatures, for example 50° C., or greater.

The inks of the invention are suitable for a wide range of applications, including the printing of packaging, including flexible film packaging, rigid packaging, cartonboard and paper packaging, the printing of décor laminates, textiles printing, graphics printing. When the inks of the invention are used to print packaging materials this may also include food packaging.

A key finding by the inventors is that the resolubility of inks comprising self-crosslinkable styrene-acrylic dispersions can be dramatically improved through the inclusion of a hydroxyl-functional PUD. At the same time, once the inks have been printed, dried and cured they can develop excellent (water) resistance, a feature in which hydroxyl-functional PUDs are deficient. To enhance the resolubility of the inks yet further the inventors have found that the optional addition of amines with boiling points preferably greater than 130° C. can induce a further improvement. Resolubility is a highly desirable feature, especially for inkjet printing applications, and denotes the ability of an ink to redissolve or redisperse into itself, or a suitable flushing solution, after it has partially, or fully dried, at temperatures of 40° C., or less. For the inkjet printing of aqueous inks, printheads are usually maintained at temperatures of 35° C., or less. To demonstrate that the inks of the invention are resoluble, the inventors dried the inks at 40° C. for up to one hour, and then assessed their resolubility/redispersibility into either deionized water or a varnish simulant of the ink. If an ink was to irreversibly dry in the nozzles of an inkjet printhead it would cause blockage of the nozzles with consequent loss of printing quality and potentially catastrophic and expensive loss of the printhead itself. This would be a significant risk for an aqueous inkjet composition comprising solely of a self-crosslinking styrene-acrylic dispersion. The inventors have shown, by way of the previously mentioned resolubility tests, that inks comprising solely of self-crosslinking styrene-acrylic emulsions do not readily redissolve/redisperse and could well cause the unwanted blockage of printheads.

The invention applies to a wide range of self-crosslinking chemistries for the styrene-acrylic polymer component of the invention. Parvate et. al. (J. Disp. Sci. Tech, 40 (2019), Issue 4, p. 519) usefully describe these chemistries, which can include; (i) the self-condensation of N-methylol functionality on the polymer backbone, (ii) the reaction of ketones (or aldehydes) attached to the polymer with hydrazides or amines, (iii) the self-condensation of organofunctional silanes attached to the polymer, (iv) metal complex (salts, chelates) reaction with polymer functional groups such as acetoacetoxy groups or carboxylic acid groups. For the printing of food packaging the carbonyl-amine crosslinking chemistry as in (ii) above has been established for well in excess of ten years. More recently, the stability issues surrounding (iv), for example the crosslinking reaction between carboxylic acid groups on the polymer backbone and a metal complex crosslinking agent, such as a titanate or zirconate organometallic, like ammonium zirconium carbonate, have been successfully resolved (U.S. Pat. No. 7,947,760).

Thus, in essence, the invention discloses an ideal solution for the printing of aqueous inkjet compositions; resoluble inks that, after printing, drying and curing, can produce highly water resistant prints. Furthermore, although the cure/crosslinking of the inks can be more rapidly achieved at elevated temperatures, 50° C. or more, prints produced using inks according to the invention can cure, at ambient temperatures, over a period of one to seven days.

To enhance the resolubility of the inks yet further, the inventors have found that the use of amines with boiling points in excess of 130° C., have a positive impact. Where optional amines are used in the inventive compositions this may be achieved either through additive addition to the ink composition. Alternatively, the polymer dispersions (and solution polymers), including the polyurethane and self-crosslinking styrene-acrylic dispersions/solutions of the invention, can be neutralized with the amines according to the invention. The inventors have also found that amines having boiling points less than 250° C. are even more preferable, since not only do they enhance the resolubility of the inventive inks they also enable the inks to crosslink effectively after drying. When an involatile amine, such as triethanolamine, with a boiling point of around 335° C., is used in compositions according to the invention, although the ink resolubility is enhanced, it can retard the cure of an ink print, especially at temperatures of 100° C., or less. The inventors believe that this is due to such involatile amines persisting in the dried print thereby limiting the curing performance. This will be shown by way of the examples. However, when amines such as N-methyldiethanolamine, boiling point of around 247° C., N-methylethanolamine, boiling point of around 160° C., 2-Amino-2-methyl-1-propanol, with a boiling point around 165° C., and N,N-dimethylethanolamine, boiling point of around 133° C. are used, not only is the resolubility enhanced but the inks more readily cure (crosslink) after drying than is the case with inks comprising triethanolamine (which is an amine still encompassed by the invention).

The addition of the amines according to the foregoing will also help to delay the onset of cure of self-crosslinking styrene-acrylic dispersions (and solutions) relying on the carbonyl-amine and carboxylic acid/carbonyl-metal complex crosslinking reactions, described above. Using an amine that persists in a drying ink will help delay/slow the crosslinking reaction between the reactive groups contained within the backbone of the self-crosslinking styrene-acrylic dispersion and the corresponding crosslinking agent contained in the aqueous phase of the dispersion. However, by using amines according to the invention (with boiling points preferably in the range 130 to 250° C., and even more preferably in the range 130 to 200° C.) allows the amine to evaporate from the ink print during drying to allow the crosslinking reaction to more rapidly occur. However, it should be stressed that the use of amines according to the foregoing is an additional, optional, feature of the invention.

The commercial advantages of this technology are very much related to the technical advantages. Although UV-curable and thermally curable aqueous inkjet compositions are well known, the technology described here opens up the potential for aqueous inkjet to deliver desirable performance in a number of applications, including; packaging, décor, textiles, graphics, etc. By overcoming the conundrum of providing an ink with excellent resolubility which at the same time can cure and develop useful print resistance properties at temperatures of 100° C. or less, even at room temperature after initial drying is a significant advance for the industry. Although this can be achieved via UV/EB-curable aqueous inkjet compositions there are innate issues with photoinitiator migratables and hydrolysis of acrylate groups, as previously mentioned. Furthermore, UV/EB-curable aqueous inkjet compositions require both a thermal drying stage and a second UV-, or EB-curing process, whereas the inks of the current invention require only a thermal drying/curing stage. As mentioned previously, the invention could also have applicability in other printing and coating applications where the resolubility conferred through the use of hydroxyl-functional PUDs would be advantageous, including flexographic printing.

Another key finding of this invention is that the inclusion of amines with boiling points in excess of 130° C., but below 250° C. (and more preferably less than 200° C.), such as N-methylethanolamine, N-methyldiethanolamine, dimethylethanolamine and 2-amino-2-methyl-1-propanol help to further promote the resolubility of the inks of the invention whilst allowing cure to take place after prints of the inks have been dried at temperatures below 100° C. Furthermore, where the inks of the invention are used in the printing of food packaging and include the optional additional amine, then dimethylethanolamine and 2-amino-2-methyl-1-propanol are especially well suited, due to having specific migration limits of 18,000 and 5,000 ppb respectively, according to current regulations.

DEFINITIONS

Self-crosslinking polymers. Self-crosslinking polymers contain a functionality which is self-reactive, and thus do not require the use of a separate co-reactant per se. A self-crosslinking polymer is usually in the form of an aqueous dispersion or emulsion and is typically the product of at least two monomers that react with one another. For example, such a polymer may contain both a carbonyl and an amine functional group. There are several mechanisms by which a polymer can be self-crosslinking. One mechanism is by the use of phase separated polymers, such as core-shell polymers. The shell polymer is hydrophilic, while the core polymer is hydrophobic. The hydrophilic shell maintains the dispersion, while the hydrophobic core provides the reactive sites for crosslinking. Alternatively or in addition, self-crosslinking polymer emulsions can comprise crosslinkable functional groups attached to the polymer backbone in addition to a crosslinker (i.e. a polyfunctional species that reacts with said crosslinkable functional groups). Typically, in self-crosslinking acrylic polymer chemistry, polymers containing ketone groups crosslink at room temperature when combined with bi- or polyfunctional compounds that are reactive towards carbonyl. One example of these reactive compounds is bishydrazides. Such self-crosslinking acrylic emulsions are provided as one pack products. The self-crosslinking reaction, depending upon the acrylic type, may also be initiated by the evaporation of water upon drying, a change of pH of the vehicle, or by curing at elevated temperatures where the cross-linking reaction occurs faster or the reactive groups are de-blocked. In a preferred embodiment, the self-crosslinking polymers used in the present invention undergo self-crosslinking at room temperature (e.g. 25° C.). In other words, self-crosslinking polymers and polymer emulsions are species that undergo crosslinking when initiated by one of the above-mentioned methods, but otherwise can be stored long-term in a stable state without undergoing significant crosslinking. Self-crosslinking polymers and polymer emulsions do not require mixing with a crosslinking agent in order to undergo crosslinking.

Self-Crosslinkable Styrene-Acrylics (SCSAs): These are preferably used in the form of a resin dispersion (sometimes referred to as emulsions or latexes), although aqueous solution polymers may also be used. The invention encompasses SCSAs that utilize a variety of crosslinking chemistries, such as for example any of the aforementioned including; carbonyl-amine, carbonyl-metal complex, carboxylic acid-metal complex, methylol self-condensation, organosilane self-condensation. As well as the monomers, such as diacetone acrylamide, acetoacetoxy ethyl methacrylate, (meth) acrylic acid used to introduce the desired reactive functionality into the polymer these polymers may comprise any blend of styrene, styrene-derivative, methacrylate and acrylate monomers. Although referred to as styrene-acrylic (or styrene-(meth)acrylic) resin dispersions, it should be understood that these materials may be essentially free of any styrene or styrene derivative or indeed composed largely of styrene and styrene derivatives. The term is used in the context of the invention to describe any resin dispersion (or solution polymer) produced by the free radical polymerization of any blend of ethylenically unsaturated monomers. It should be appreciated by those skilled in the art that it is not necessary to list all the monomers that may be used to produce such dispersions and that other monomers including vinyl, (meth)acrylamide and olefinic types may also form part of such resin solutions and dispersions. The resin dispersions are commonly prepared by emulsion polymerization, using any blend of anionic and non-ionic surfactants; surfactant free dispersions are also covered by the invention, as are protective colloid stabilized dispersions. Solution styrene and acrylic copolymers are prepared usually by solution or solvent free radical polymerization processes, with the polymer being brought into aqueous solution by the neutralization of the acid groups of the polymer. The invention also covers the use of core-shell styrene-(meth)acrylic resin dispersions where the resin particles are heterophasic in nature with two or more discrete polymer phases. An optional embodiment of the invention includes the use of SCSAs which have been neutralized using amines with boiling points in excess of 130° C., in line with an optional embodiment of the invention. There is no restriction on the amine and examples include, but are not limited to; N,N-dimethylethanolamine, N-methylethanolamine, N-methyldiethanolamine, 2-amino-2-methyl-1-propanol, ethanolamine, propanolamine, triethanolamine. In a further embodiment it is preferred that the boiling point of the amine should be less than 250° C., and more preferably less than 200° C.

OH-PUD=Hydroxy-functional polyurethane dispersion. Both anionically and non-ionically stabilized OH-PUDs may be used. It is preferable that the OH-PUDs have an average particle size of less than 200 nm and more preferably less than 100 nm. Furthermore, the OH-PUD may be synthesized from any blend of polyol precursors including, but not limited to; polyether diols, polyester diols, polyacrylic diols and polycarbonate diols or blends and hybrids thereof. It is preferred that the OH-PUD should have a hydroxyl value of 50 mgKOH, or greater, based on the dry polymer weight.

$T_g$=Glass transition temperature. The glass transition temperature can be determined using differential scanning calorimetry (DSC) according to the process defined in ASTM E1356-08. The sample was maintained under an atmosphere of dry nitrogen for the duration of the scan. A flow rate of ml/min and Al pans were used. Samples (5 mg) were heated at 20° C./min from 20° C. to 350° C. The value of a $T_g$ was determined as the extrapolated onset temperature of the glass transition observed on the DSC scans (heat flow (W/g) against temperature (° C.)), as described in ASTM E1356-08.

Boiling point=unless otherwise specified, all boiling points are measured under standard atmospheric pressure of 100 kPa.

(w/w)=mass of component as a percentage of the total mass of the composition.

Multifunctional amine=comprising at least two amine groups.

Hydroxyl Value (OHV): This is defined as the number of milligrams of potassium hydroxide required to neutralize the acetic acid taken up on acetylation of one gram of a chemical substance that contains free hydroxyl groups. The standard procedure as defined in ISO 4629-1:2016(E) can be used to determine the Hydroxyl value.

Acid Value (AV): The mass of potassium hydroxide (KOH) in milligrams that is required to neutralize one gram of chemical substance. Unless stated otherwise, reference to the acid value is to the total acid value and is suitably measured in accordance with ISO 2114:2000(E) (method B) standard.

Resolubility/Redispersibility: This is a feature of the inks of the invention and is the ability of a partially or fully dried ink to redissolve or redisperse back into the ink fluid or a suitable flushing solution. For inkjet applications this is a most desirable property, as it reduces the risks associated with inks becoming irreversibly dried in the nozzles of an inkjet printhead. The inventors have shown, by way of a simple test, that inks prepared according to the invention have excellent resolubility.

Resistance Properties: Essentially, this describes the development of resistance properties of an ink after it has been printed and dried. In the context of the current invention the cure of the prints has been assessed by testing the water resistance of the prints.

It is worth noting that the invention describes, to the best of the inventors' knowledge, the first reported instance of crosslinkable aqueous printing inks comprising a combination of a SCSA and a OH-PUD, with the OH-PUD conferring a degree of resolubility which is highly desirable for aqueous inkjet printing inks.

Although it is possible to prepare inks on SCSAs having acceptable resolubility/redispersibility for applications such as flexographic printing (where it is sufficient to be able to remove any drying ink from a printing cylinder by mechanical cleaning) the inventors have found that SCSAs have potentially unacceptable resolubility/redispersibility for inkjet printing applications, especially as shown by way of the examples when inks are dried at temperatures up to 40° C. The invention overcomes the poor resolubility of SCSAs through the use of hydroxyl-functional polyurethane dispersions, preferably having hydroxyl values of greater than 50 mgKOH/g. Such hydroxyl-functional PUDs can have excellent resolubility, but a consequence of this is that the water resistance of prints prepared with inks comprising them as the sole resin binder can be deficient. Thus, by combining SCSAs with OH-PUDs it is possible to produce aqueous printing inks which have acceptable resolubility and print performance in terms of the water resistance that can be achieved once the inks have dried and cured.

The inventors have also shown, by way of the examples, that the higher the hydroxyl value of a OH-PUD, generally the better is the resolubility of the ink. This is probably due to the increased hydrophilicity associated with OH-PUDs having more hydroxyl groups as part of their structure. As mentioned previously, it is preferred that the hydroxyl value of a OH-PUD should preferably be greater than 50, based on the dry polymer weight.

The invention encompasses aromatic and aliphatic OH-PUDs and further encompasses OH-PUDs produced from polyether diols, polyester diols, polyacrylic diols and polycarbonate diols or any blend or hybrid thereof. As previously stated, the OH-PUDs may be anionic or non-ionic in terms of their stabilization, or a combination of the two stabilization mechanisms. Anionic OH-PUDs are commonly produced by the inclusion of a carboxylic acid into the polymer structure of the PUD, for example by the urethane reaction of dimethylol propionic acid ('DMPA'). Where DMPA, or other acid-containing species, is incorporated into the OH-PUD backbone then it may be neutralized with any organic or inorganic base to enable the anionic stabilizing mechanism. In a preferred embodiment, an OH-PUD should have pendant hydroxyl groups. OH-PUDs having hydroxyl values of preferably greater than 50 mgKOH/g (based on the dry polymer weight) may be synthesised by a number of ways including using an excess of diol to diisocyanate to produce a hydroxyl terminated PUD or by using a hydroxyl functional end-capping reagent such as ethanolamine or diethanolamine to react onto an isocyanate-functional PUD prepolymer. It should be understood that the method of preparing the hydroxyl functional PUD of the invention is not important other than that it meets the requirements of the invention concerning hydroxyl value.

As previously described, where the SCSA is in the form of an aqueous polymer dispersion, it may be non-ionically or anionically stabilized, or use a combination of the two stabilization mechanisms. The invention also covers SCSA dispersions prepared using a stabilizing protective colloid. In the latter case, the term protective colloid refers to the use of an aqueous solution polymer to stabilize the dispersion of the SCSA, during its manufacture. Such solution polymers include, but are not limited to; solution styrene-acrylics, poly(vinyl alcohol)s, hydroxyethyl cellulose and poly(vinyl pyrrolidone)s. In the case of solution styrene-acrylics being used as the protective colloid, these are usually carboxylic acid-functional styrene-acrylic copolymers where neutralization of the acid groups with a suitable base allows the preparation of an aqueous solution of the polymer. Such solution styrene-acrylic copolymers are well known to those skilled in the art, as is their use in the preparation of SCSA dispersions. There is no restriction on the Tg of the SCSA and the invention generally covers SCSAs with Tg's of between −40 and 120° C. Likewise, there is no restriction on the acid value of the SCSA, which may generally be in the range of 0 to 250 mgKOH/g, based on the dry polymer weight. The SCSA dispersion or solution polymer may be neutralized with any blend of organic and inorganic bases and there is no restriction on the selection of bases used to achieve this. However, in another optional aspect of the invention, the SCSA may be neutralized with those amines as described elsewhere; that is those having boiling points greater than 130° C.

There is no restriction on the total amount of resin binder that can be used in inks prepared according to the invention, but may be in the range 2.5% (w/w) to 40.0% (w/w), more preferably in the range 5.0% (w/w) to 30.0% (w/w) and most preferably, especially for aqueous inkjet printing inks in the range 5.0% to 20.0% (w/w) of the total ink composition, based on the dry combined weight of the SCSA and OH-PUD.

There is no restriction on the ratio of the SCSA to OH-PUD, but it should preferably be in the range, based on dry polymer weight, of 1:10 to 10:1, and more preferably in the range 2:8 to 8:2. For example, the ratio of the SCSA to OH-PUD can be in the range, based on dry polymer weight, of 2:8 to 6:4, such as 2:8 to 1:1. In other words, the ratio of the SCSA to HO-PUD can be in the range, based on dry polymer weight, of 0.2:1.0 to 4:1, such as 0.2:1.0 to 1.6:1.0, or 0.2:1.0 to 1.3:1.0, or 0.2:1.0 to 1.0:1.0, or 0.2:1.0 to 0.8:1.0, such as 0.2:1.0 to 0.6:1.0, or 0.2:1.0 to 0.4:1.0.

The SCSA is advantageously incorporated into the compositions in amounts, based on dry polymer weight, of less than 50 wt %, such as less than 40%, less than 30 wt %, less than 20 wt %, less than 10 wt %, such as between 0.01 and 20 wt %, between 1 and 10 wt %, or between 1.5 and 8 wt %, or around 5 wt %.

The OH-PUD is advantageously incorporated into the compositions in amounts, based on dry polymer weight, of less than 50 wt %, such as less than 40%, less than 30 wt %, less than 20 wt %, less than 10 wt %, such as between 0.01 and 20 wt %, between 1 and 10 wt %, or between 4 and 10 wt %, or between 6 to 8 wt %, or around 8 wt %.

What follows is a description of the test that the inventors have used in assessing the resolubility of inkjet inks. Approximately 60 μm ink layers were applied onto glass slides using a No. 6 K-Bar (ex. RK Print). The ink film was then dried at 40° C. for 30 minutes. The dried ink was then immersed in an aqueous mixture comprising 25% (w/w) propylene glycol, 0.5% Tegowet KL245 (surfactant, ex. Evonik) and 0.5% (w/w) of an appropriate amine (triethanolamine, or the amine used in preparing the ink), the rest being deionised water. A highly resoluble ink will rapidly redissolve/redisperse into the immersion fluid, typically within 2 to minutes, whereas an insoluble ink would fail to redisperse within 30 minutes of immersion.

An optional feature of the invention is that the printing inks comprise amines having boiling points greater than 130° C. Non-limiting examples of such amines include; N,N-dimethylethanolamine, tripropylamine, N-methylethanolamine, 2-amino-2-methyl-1-propanol, ethanolamine, propanolamine, butanolamine, N-methyldiethanolamine, triethanolamine. For the printing of food packaging, those amines having specific migration limits of 50 ppb, or greater are especially preferred. The inventors have found that amines with boiling points of less than 250° C., and more so less than 200° C., are preferable as they not only promote the resolubility of inks prepared according to the invention but also do not impact the development of cure of prints to the same extent as an amine such as triethanolamine, with a boiling point of 335° C.

The amine, when present in the composition, is advantageously incorporated in an amount of 10% (w/w) or less, such as 8% (w/w) or less, 6% (w/w) or less, 4% (w/w) or less, 2% (w/w) or less, 1% (w/w) or less, or 0.5% (w/w) or less.

The printing inks of the invention may optionally comprise any water-soluble organic co-solvent. Although volatile solvents such as ethanol, propanol and isopropanol may be used, where the inks are intended for inkjet printing it is preferred that those which are not highly flammable or volatile should be used, typically a polyol, an alkylene glycol, an alkylene glycol ether or ether acetate type, with the following non-limiting examples: 4-hydroxy-4-methyl-2-pentanone, diethyelene glycol, diethylene glycol butyl ether, diethylene glycol ethyl ether, diethylene glycol methyl ether, diethylene glycol monoethyl ether acetate, diethylene glycol monopropyl ether, dipropylene glycol, dipropylene glycol ethyl ether, dipropylene glycol methyl ether, ethylene glycol butyl ether, ethylene glycol ethyl ether, ethylene glycol isopropyl ether, ethylene glycol methyl ether, ethylene glycol propyl ether, glycerine carbonate, N-methyl 2-pyrrolidone, glycerol, propylene glycol, propylene glycol ethyl ether, propylene glycol ethyl ether acetate, propylene glycol methyl ether, propylene glycol n-propyl ether, triethylene glycol, triethylene glycol butyl ether, triethylene glycol methyl ether, tripropylene glycol, tripropylene glycol methyl ether, N-methyl pyrollidone, urea, and the like. As mentioned previously, it is preferred that where such co-solvents are used, they should form less than 35% (w/w), and more preferably less than 30.0% (w/w) and even more preferably 25% (w/w), or less of the ink composition. Furthermore, it is preferred that the concentration of solvents having boiling points of greater than 250° C. should be less than 10.0% (w/w) and more preferably less than 5.0% (w/w) of the ink composition.

A further optional feature of the invention is the use of crosslinkers, such as polycarbodiimides, to further enhance the cure of the inks. Polycarbodiimides are a preferred class of optional additional crosslinker, but the invention also encompasses polyoxazolines, metal complex crosslinking agents (including titanate and zirconate organometallics), polyaziridines, amino resins (e.g. melamine-formaldehydes), blocked isocyanates, epoxies. The inventors have shown that stable and resoluble inks can be prepared with the inclusion of a polycarbodiimide (Carbodilite V-02-L2, ex. Nisshinbo has been used successfully by the inventors).

Since the products of the current invention are primarily water-based in nature, it is also preferable to include a biocide or anti-mold agent. Suitable examples include products based on, but not limited to, the following biocide structural types: benz-isothiazolinone, bromo-nitro-propane-diol, isothiazolinone, ethylenedioxydimethanol, or iodo-propynyl butyl carbamate. Some commercially available grades include those marketed under the trade names Intercide (Akcros Chemicals) or Nipacide (Clariant). Other types of biocide that could be considered include sodium dehydroacetate (Geogard 111S from Lonza), sodium benzoate (Vancide 51 from R. T. VANDERBILT), sodium pyridinethiol-1-oxide (Sodium Omadine from Arch Chemicals), sodium salt of o-phenylphenol (Dowicide A from DOW Chemical) and ethyl p-hydroxybenzoate (Nipastat Sodium from Aako). These are preferably used at an amount of 0.01 to 1.00% by mass in the ink composition.

Defoamers can also optionally be included in the formulation; these prevent the formation of foam during manufacture of the ink and also while jetting. Defoamers are particularly important with recirculating printheads. Examples of suitable defoamers include, but are not limited to, TEGO FOAMEX N, FOAMEX 1488, 1495, 3062, 7447, 800, 8030, 805, 8050, 810, 815N, 822, 825, 830, 831, 835, 840, 842, 843, 845, 855, 860, and 883, TEGO FOAMEX K3, TEGO FOAMEX K7/K8 and TEGO TWIN 4000 available from Evonik. Available from BYK are BYK-066N, 088, 055, 057, 1790, 020, BYK-A 530, 067A, and BYK 354. The additives DC62, DC65, DC 68, DC71 and DC74 are available from Dow Corning. Agitan 120, 150, 160, 271, 290, 298, 299, 350, 351, 731, 760, 761, and 777 are available from Munzing. Surfynol 104PA, AD01, DF-110, DF-58, DF-62, DF-66, DF-695, DF-70, and MD-20 are available from Air Products.

Surface control additives are often optionally used to control the surface tension of the ink, which is required to adjust the wetting on the face plate of the printhead, and also to give the desired drop spread on the substrate, or, in the case of multi pass inkjet printing, wet on dry drop spread. They can also be used to control the level of slip and scratch resistance of the coating. Examples of suitable surface control additives include but are not limited to TEGO FLOW 300, 370, and 425, TEGO GLIDE 100, 110, 130, 406, 410, 411, 415, 420, 432, 435, 440, 482, A115, and B1484, TEGO GLIDE ZG 400, TEGO RAD 2010, 2011, 2100, 2200N, 2250, 2300, 2500, 2600, 2650, and 2700, TEGO TWIN 4000 and 4100, TEGO WET 240, 250, 260, 265, 270, 280, 500, 505, and 510 and TEGO WET KL245, all available from Evonik. Available from BYK are BYK 333 and 337, BYK UV 3500, BYK 378, 347 and 361, BYK UV 3530 and 3570, CERAFLOUR 998 and 996, NANOBYK 3601, 3610, and 3650, and CERMAT 258. Available from Cytec are EBECRYL 350 and 1360, MODA-FLOW 9200, and EBECRYL 341. From Sartomer the aliphatic silicone acrylate CN9800 may be used. Surfynol 104, 420, 440, 465, 485, 61, 82, and 2502 are available from Air Products. Multiwet BD, EF, SU, SO, and VE are available from Croda. Capstone FS-30, 31, 34, 35, 50, 51, 60, 61, 63, 64, 65, and 3100 are available from Du Pont.

Included in the ink formulation can optionally be a suitable de-aerator. These prevent the formation of air inclusions and pinholes in the cured coating. These also reduce rectified diffusion, which can cause reliability issues in the printhead. Non-limiting examples include the following products available from Evonik: TEGO AIREX 900, 910, 916, 920, 931, 936, 940, 944, 945, 950, 962, 980, and 986.

The ink compositions of the present invention may optionally contain one or more colorants, including pigments and/or dyes. Examples of suitable organic or inorganic pigments include carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitroanilines, pyrazoles, diazopyranthrones, pyrazoles, dianisidines, pyranthrones, tetracholoroisoindolines, dioxazines, monoazoacrylides and anthrapyrimidines. The dyes include but are not limited to azo dyes, anthraquinone dyes, xanthene dyes, azine dyes, combinations thereof and the like.

Commercial organic pigments classified according to Color Index International may be used, including, but not limited to, those according to the following trade designations: blue pigments PB1, PB15, PB15:1, PB15:2, PB15:3, PB15:4, PB15:6, PB16, PB60; brown pigments PBS, PB23, and PB265; green pigments PG1, PG7, PG10 and PG36; yellow pigments PY3, PY14, PY16, PY17, PY24, PY65, PY73, PY74 PY83, PY95, PY97, PY108, PY109, PY110, PY113, PY128, PY129, PY138, PY139, PY150, PY151, PY154, PY156, PY175, PY180 and PY213; orange pigments PO5, PO15, PO16, PO31, PO34, PO36, PO43, PO48, PO51, PO60, PO61 and PO71; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; black pigments PBk1, PBk6, PBk7, PBk8, PBk9, PBk10, PBk11, PBk12, PBk13, PBk14, PBk17, PBk18, PBk19, PBk22, PBk23, PBk24, PBk25, PBk26, PBk27, PBk28, PBk29, PBk30, PBk31, PBk32, PBk33, PBk34, PBk35, NBk1, NBk2, NBk3, NBk4, NBk6; combinations thereof, and the like.

The pigments are milled to typically less than 1 micrometer after milling with a preferred particle size distribution of 10-500 nm, more preferably 10-350 nm to have better transparency and a wide color gamut.

In order to incorporate the above-described pigments to the inventive compositions, it is preferable that the pigments are manufactured and stably stored as a pigment concentrate in water. This is typically achieved by dispersing the pigment into a water-soluble or water-dispersible resin using a water-soluble and/or a water-dispersible surfactant which introduces hydrophilic functional groups into the surface of the pigment particles. Examples of these dispersing resins are numerous and could include polyvinyl alcohols, polyacrylic acid, acrylic acid-acrylonitrile copolymers, vinyl acetate-acrylate copolymers, acrylic acid-acrylate copolymers, styrene-acrylic acid copolymers, styrene-methacrylic acid copolymers, styrene-methacrylic acid-acrylate copolymers, styrene-alpha methyl styrene-acrylic acid copolymers, styrene-alpha methyl styrene-acrylic acid-acrylate copolymers, styrene-maleic acid copolymers, styrene-maleic anhydride copolymers, vinyl naphthalene-acrylic acid copolymers, vinyl naphthalene-maleic acid copolymers, vinyl acetate-maleate copolymers, vinyl acetate-crotonic acid copolymers, and vinyl acetate-acrylic acid copolymers, and the salts thereof. The copolymers can be used in any form of random copolymer, block copolymer, alternating copolymer and graft copolymer. Examples of such resins include Joncryl 67, 678, 8500, 586, 611, 680, 682, 683 and 69 available from BASF. These resins are commonly neutralized with ammonia to enable the preparation of polymer solutions. It is also possible to neutralize such resins with any other organic amine, or indeed an inorganic base. It should be understood that these dispersants do not form an integral part of the inventive composition as outlined above. However, if they include any of the self-crosslinking chemistries as previously described then they will be more integrally encompassed by the invention.

Pigments may also be dispersed using any blend of surfactants, examples of which include, but are not limited to, anionic surfactants such as alkane sulphonates, alpha-olefin sulphonates, alkyl benzene sulphonates, alkyl naphthalene sulphonates, acyl methyl taurinates, dialkyl sulfosuccinates, alkyl sulfates, sulfurized olefins, polyoxyethylene alkyl ether phosphates, polycarboxylic acids and mono glycerol phosphate, amphoteric surfactants such as alkylpyridinium salts and non-ionic surfactants such as polyoxyethylene alkyl ethers, polyoxyethylene alkyl phenyl ethers, polyoxyethylene alkyl esters, polyoxyethylene alkyl amides, glycerol alkyl esters and sorbitan alkyl esters. Examples include EFKA 1000, 4000, 5000 and 6000 series products from BASF, Tamol series products from Dow, and Solsperse 27,000, 40,000, 44,000, 46,000 and 47,000 from Lubrizol.

The inkjet compositions of the current invention are suitable for printing by either multipass or single-pass operations, terms well understood within the industry. The applications that are covered by the invention include, but are not limited to, the multipass printing of textiles, including cotton-rich fabrics, the single-pass printing of textiles, the multipass printing of packaging, including cartonboard, the single pass printing of packaging, including corrugated, cartonboard and flexible packaging, the single pass and multipass printing of metal substrates including metal decoration of cans and décor printing. In all cases the printing of the inventive inkjet compositions may be preceded by the application of a print-receptive primer to the substrate to be printed. The substrates to be printed, especially packaging substrates including polyester films, polypropylene films, nylon films, cellulose acetate films, polyethylene films, aluminum foils, metal sheets and rolls and any coated derivative thereof may be further treated prior to printing via corona discharge or plasma treatments to enhance the adhesion and print receptivity. Likewise, the printed material may be subject to further operations to realize a final product, including but not limited to, over-lacquering, lamination, etc.

As indicated above, to enhance the print receptivity of substrates printed via inkjet they may be coated prior to printing with a primer coating. There is no restriction on the use of or type of primer coating, but those comprising a multivalent salt, such as calcium chloride, calcium acetate, magnesium chloride, magnesium acetate, aluminum sulphate, etc. are preferable. Such primers work with inkjet inks of the invention by helping to 'fix' the print design, reducing issues such as dot gain, line spread, inter-colour bleed, mottle and graininess. Various types of primer and their use in the control of the print quality of pigmented aqueous inkjet printing inks are well known in the art. Therefore, in a further optional embodiment of the invention, inkjet printing inks according to the invention are printed onto substrates which have been pre-coated with such primers.

The present invention has been described in detail, including the preferred embodiments thereof. However, it will be appreciated that those skilled in the art, upon consideration of the present disclosure, may make modifications and/or improvements on this invention that fall within the scope and spirit of the invention.

Materials

Daotan 6425: a polyurethane dispersion, with a solid content of around 40% and a hydroxyl value of about 55 mgKOH/g, satisfying an aspect of the invention (ex. Allnex).

Daotan 7000: a polyurethane dispersion, with a solid content around 40% and hydroxyl value of about 170 mgKOH/g, satisfying an aspect of the invention.

P-PUD: A proprietary polyurethane dispersion, with a solid content of around 30%, and a hydroxyl value of around 170-180 mgKOH/g, satisfying an aspect of the invention.

Daotan 7225: a polyurethane dispersion, with a solid content around 40% and hydroxyl value of about 98 mgKOH/g, satisfying an aspect of the invention.

Daotan 6450: a polyurethane dispersion, with a solid content around 30% and hydroxyl value of about 0 mgKOH/g, falling outside the scope of the invention.

Neocryl A1125: An aqueous self-crosslinking acrylic polymer solution (ex. DSM). Solids content=19-20%.

Joncryl FLX5000: An aqueous self-crosslinking acrylic polymer dispersion (ex. BASF). Solids content=42%.

Joncryl FLX5010: An aqueous self-crosslinking acrylic polymer dispersion (ex. BASF). Solids content=45.5%.

Joncryl FLX5020: An aqueous self-crosslinking acrylic polymer dispersion (ex. BASF). Solids content=41%.

Joncryl FLX5040: An aqueous self-crosslinking acrylic polymer dispersion (ex. BASF). Solids content=42.5%.

Joncryl FLX5060: An aqueous self-crosslinking acrylic polymer dispersion (ex. BASF). Solids content=43%.

Neocryl A1120: An aqueous self-crosslinking acrylic polymer dispersion (ex. DSM). Solids content=55%.

Neocryl A1129: An aqueous self-crosslinking acrylic polymer dispersion (ex. DSM). Solids content=39-41%.

Neocryl XK14: An aqueous self-crosslinking acrylic polymer dispersion (ex. DSM). Solids content=19-20%.

Tegowet KL245: A surfactant (ex. Evonik)

Triethanolamine: Boiling point=335.4° C.

N,N-Dimethylethanolamine: Boiling point=134.1° C.

N-Methylethanolamine: Boiling point=158.1° C.

Methyldiethanolamine: Boiling point=247.1° C.

2-Amino-2-methyl-1-propanol: Boiling point=165.5° C.

Propylene glycol: A water soluble co-solvent, with a boiling point of around 188° C.

Carbodilite V-02-L2: A water-soluble polycarbodiimide crosslinker (ex. Nishinbo).

Cyan Pigment Dispersion: A proprietary dispersion of cyan 15:3 pigment, comprising about 16% (w/w) pigment.

Tests

Viscosity: The viscosity of the inks were measured at 32° C. using a Brookfield DV-II+ Pro Viscometer equipped with Spindle no. 18, at 100 rpm.

Resolubility Testing: Approximately 60 μm ink films were applied to glass slides using a No. 6 K-Bar applicator (ex. RK Print). The inks were then dried for minutes at 40° C., before being immersed in deionized water or an aqueous solution comprising 25% propylene glycol, 0.5% Tegowet KL245 and 0.5% of 2-amino-2-methyl-1-propanol (this is referred to as 'Varnish').

Resolubility was assessed as follows:

(1) Highly Resoluble (the dried ink film dispersed in the soaking fluid in less than 2 minutes, with no visible signs of any undissolved ink).

(2) Resoluble (the dried ink film dispersed in the soaking fluid in 2 to minutes, with no visible signs of any undissolved ink)

(3) Partial (evidence of the ink dispersing in the soaking fluid, but with minor undissolved ink particles persisting for more than 5 minutes).

(4) Slight (the ink print breaks up in to flakes which persist for more than minutes, with very little evidence of the ink redispersing into the soaking fluid).

(5) Insoluble (no evidence for the ink redispersing into the soaking medium).

For the purposes of the present invention, higher initial resolubility is advantageous. Thus, after 15 minutes at room temp., the inks should exhibit at least slight resolubility (4); and preferably partial (3); more preferably resoluble (2); and most preferably highly resoluble (1) as described above.

Print Preparation: The inks were applied to white polyester coated steel plates at 6 μm, using a No. 1 K-Bar applicator (ex. RK Print). The prints were then dried for seconds using a hot air blower. The prints were allowed to stand at room temperature for a further 15 minutes before being tested for their water resistance. The prints were then heated for 2 minutes at 50, 75 and 100° C. and tested for water resistance. For a number of inks, a further set of prints were heated to 50° C. for 1 minute before being allowed to stand at ambient conditions (22 to 25° C.) for one to seven days with the water resistance being assessed through this post-printing curing process.

Cure/Water Resistance: Cure is assessed by water resistance of the prints as determined by rubbing the print with a cotton wool bud soaked in water. Failure mode is the number of double rubs (back and forth rub) required to remove or disrupt the print; this is a test well known in the industry. There are two distinct stages where printed ink cure is particularly relevant in the present invention; Stage 1—initial cure (i.e. 15 min. at room temp.); and Stage 2—post-cure (i.e. after 2 min. exposure to 50, 75 & 100° C., or after 24 hr. at room temp.)

For Stage 1, the inks of the present invention would preferably reach failure mode at ≤20 double water rubs, more preferably ≤15, most preferably ≤12, after 15 min. at room temperature, which is indicative of initial resolubility.

The cure and water resistance of the inks will then increase after exposure to elevated temperature, or after extended storage at room temperature, as is demonstrated in the ensuing data tables 1-4. For Stage 2, the inks would preferably withstand ≥50 double rubs, more preferably ≥100, after heating at 100° C. for 2 minutes, or after storing at room temperature for 2 days. The water resistance at 50 and 75° C. in tables 1-4 are meant to exhibit the progression of cure over time.

First Set of Inks Prepared According to the Invention

To demonstrate the benefit of blending a SCSA with an OH-PUD, a number of compositions suitable for inkjet printing were prepared according to Table 1.

an ink's suitability for surface print applications. Inventive examples I2 vs. I3 demonstrate the usefulness of the addition of an amine according to an optional aspect of the invention; including 0.2% of triethanolamine enhances the resolubility of the ink, while still allowing for effective cure.

To show the impact that the optional inclusion of an amine having a boiling point greater than 130° C. might have, the examples outlined in Table 2 were prepared and tested according to the previous guidelines. As well as triethanolamine (boiling point of around 335° C.), N-methylethanolamine (boiling point around 160° C.), 2-amino-2-methyl-1-propanol (boiling point around 165° C.) and N,N-dimethylethanolamine (boiling point around 133° C.), were also assessed.

It is clear from Table 2 that the selection of amine can play a role in both the ink resolubility and cure. All the amines used in the preparation of the inks of Table 2 promoted the resolubility of the inks. However, triethanolamine (I8), with its high boiling point (335° C.) retarded the development of

TABLE 1

Aqueous Inkjet Formulations Demonstrating the Benefits of the Invention

| | [1]Example | | | | | | | |
| | C1 | C2 | I1 | I2 | I3 | I4 | I5 | I6 |
| --- | --- | --- | --- | --- | --- | --- | --- | --- |
| Deionized Water | 14.6 | 14.6 | 14.6 | 14.6 | 14.8 | 14.6 | 14.6 | 14.6 |
| Propylene glycol | 30.0 | 30.0 | 30.0 | 30.0 | 30.0 | 30.0 | 30.0 | 30.0 |
| Tegowet KL245 | 0.2 | 0.2 | 0.2 | 0.2 | 0.2 | 0.2 | 0.2 | 0.2 |
| Triethanolamine | 0.2 | 0.2 | 0.2 | 0.2 | — | 0.2 | 0.2 | 0.2 |
| Daotan 7000 | 30.0 | — | 20.0 | 15.0 | 15.0 | 25.0 | 20.0 | 15.0 |
| Neocryl A1125 | — | 30.0 | 10.0 | 15.0 | 15.0 | — | — | — |
| Joncryl FLX5000 | — | — | — | — | — | 5.0 | 10.0 | 15.0 |
| Cyan Pigment Dispersion | 25.0 | 25.0 | 25.0 | 25.0 | 25.0 | 25.0 | 25.0 | 25.0 |
| Total | 100 | 100 | 100 | 100 | 100 | 100 | 100 | 100 |
| | Viscosity Measurements | | | | | | | |
| [2]Viscosity at 32° C. (mPa · s) | 7.47 | 7.56 | 7.47 | 7.50 | 7.41 | 7.62 | 7.89 | 8.04 |
| [3]Ink viscosity after being stored at 50° C. for 14 days | 7.50 | 7.62 | 7.59 | 7.62 | — | 7.65 | 7.83 | 8.25 |
| | Resolubility Assessment | | | | | | | |
| Resolubility | Highly Resoluble | Insoluble | Highly Resoluble | Resoluble | Partial | Highly Resoluble | Highly Resoluble | Partial |
| | Cure/Water Resistance Failure Mode of Prints (Double Wet Rubs) | | | | | | | |
| Double wet rubs after 15 min. at room temp. | 1 | 20 | 1 | 1 | 2-3 | 1 | 1 | 3 |
| Double wet rubs after 50° C. for 2 min. | 2 | >100 | 2 | 2 | 6 | 2 | 5 | 40 |
| Double wet rubs after 75° C. for 2 min. | 6 | >100 | 40 | 35 | 50 | 80 | >100 | >100 |
| Double wet rubs after 100° C. for 2 min. | 40 | >100 | >100 | >100 | >100 | >100 | >100 | >100 |
| Double wet rubs after room temp. for 2 days | — | — | — | — | — | — | >100 | — |

[1]Example: C1, C2, etc. = Comparative Examples; I1, I2, etc. = Inventive Examples
[2]Initial viscosity and viscosity after storage at 50° C. for 14 days is indicative of the viscosity stability of the inks of the present invention. In a preferred embodiment the initial viscosity would increase ≤20% after 14 days at 50° C.; more preferably ≤10%, and most preferably ≤5%.

The results in Table 1 clearly show the benefits of the invention in that inks with some degree of resolubility can be prepared by blending OH-PUDs and SCSAs, whilst enabling prints of the inventive inks to cure effectively at either elevated temperatures or after being allowed to cure at room temperature for an extended period, as is the case for Inventive Example 5. It is clear from Table 1 that inks based solely on an SCSA (C2) have very poor resolubility, which could limit their suitability for inkjet printing. However, an ink based solely on a OH-PUD (C1) although having excellent resolubility, produces prints of deficient cure/water resistance. This poor cure/water resistance would limit such cure of the print of I8 in all instances, though it remains within the scope of the present invention. The other amines used in the Inventive examples of Table 2 with boiling points ranging between around 130 and 170° C. not only enhanced the ink resolubility but also allowed the cure of prints to develop much more satisfactorily than was the case with triethanolamine. These examples show the benefit of the careful selection of the optional amine component of the invention, namely that where an amine is used, it would preferably have a boiling point greater than 130° C., but less than 200° C.

TABLE 2

| | | | | Impact of Amine on Ink Resolubility and Cure | | | |
|---|---|---|---|---|---|---|---|
| | | | | Example | | | |
| | [1]I7 | I8 | I9 | I10 | I11 | I12 | I13 |
| Deionized Water | 13.1 | 12.9 | 12.9 | 12.9 | 12.9 | 13.7 | 14.6 |
| Propylene glycol | 25.0 | 25.0 | 25.0 | 25.0 | 25.0 | 25.0 | 25.0 |
| Tegowet KL245 | 0.2 | 0.2 | 0.2 | 0.2 | 0.2 | 0.2 | 0.2 |
| Triethanolamine | — | 0.2 | — | — | — | — | — |
| 2-Amino-2-methyl-1-propanol | — | — | — | 0.2 | — | 0.2 | 0.2 |
| N-methylethanolamine | — | — | 0.2 | — | — | — | — |
| N,N-dimethy lethanolamine | — | — | — | — | 0.2 | — | — |
| P-PUD | 26.7 | 26.7 | 26.7 | 26.7 | 26.7 | 23.4 | 20.0 |
| Joncryl FLX5000 | 10.0 | 10.0 | 10.0 | 10.0 | 10.0 | 12.5 | 15.0 |
| Cyan Pigment Dispersion | 25.0 | 25.0 | 25.0 | 25.0 | 25.0 | 25.0 | 25.0 |
| Total | 100 | 100 | 100 | 100 | 100 | 100 | 100 |
| Viscosity Measurements | | | | | | | |
| Viscosity at 32° C. (mPa · s) | 6.48 | 6.45 | 6.45 | 6.51 | 6.48 | 6.39 | 6.57 |
| | | | Resolubility Assessment | | | | |
| Resolubility | Resoluble | Highly Resoluble | Highly Resoluble | Highly Resoluble | Highly Resoluble | Resoluble | Resoluble |
| | | Cure/Water Resistance Failure Mode of Prints (Double Wet Rubs) | | | | | |
| Double wet rubs after 15 min. at room temp. | 3 | 1-2 | 1 | 1 | 1 | 3 | 4 |
| Double wet rubs after 50° C. for 2 min. | 6 | 1-2 | 1-2 | 1-2 | 4 | 4 | 6 |
| Double wet rubs after 75° C. for 2 min. | 30 | 4 | 20 | 20 | 20 | 25 | 45 |
| Double wet rubs after 100° C. for 2 min. | >100 | 60 | >100 | >100 | >100 | >100 | >100 |
| Double wet rubs after room temp. for 2 days | >100 | 55 | >100 | >100 | >100 | >100 | >100 |

[1]Note:
Ex. 17 does not contain amine, and though it remains within the scope of the current invention, it is used comparatively in Table 2 as a means of assessing the role that various amines play in cure and resolubility.

To show the impact of the PUD, and more specifically the effect of the hydroxyl value on the ink and print properties, ink compositions according to Table 3 were prepared and tested in line as previously described.

TABLE 3

| | | | | |
|---|---|---|---|---|
| | The Influence of PUD Selection on Ink and Print Properties | | | |
| | Example | | | |
| | I14 | I15 | I16 | C3 |
| Deionized Water | 19.6 | 19.6 | 19.6 | 19.6 |
| Propylene glycol | 25.0 | 25.0 | 25.0 | 25.0 |
| Tegowet KL245 | 0.2 | 0.2 | 0.2 | 0.2 |
| 2-Amino-2-methyl-1-propanol | 0.2 | 0.2 | 0.2 | 0.2 |
| Daotan 7000 (Hydroxyl value = 170 mgKOH/g) | 20.0 | — | — | — |
| Daotan 7225 (Hydroxyl value = 98 mgKOH/g) | — | 20.0 | — | — |
| Daotan 6425 (Hydroxyl value = 55 mgKOH/g) | — | — | 20.0 | — |
| Daotan 6450 (Hydroxyl value = 0 mgKOH/g) | — | — | — | 20.0 |
| Joncry1 FLX5000 | 10.0 | 10.0 | 10.0 | 10.0 |
| Cyan Pigment Dispersion | 25.0 | 25.0 | 25.0 | 25.0 |
| Total | 100 | 100 | 100 | 100 |
| Viscosity at 32° C. (mPa · s) | 6.45 | 6.45 | 6.45 | 6.48 |
| | Resolubility Assessment | | | |
| Resolubility | Highly Resoluble | Highly Resoluble | Resoluble | Insoluble |
| | Cure/Water Resistance Failure Mode of Prints (Double Wet Rubs) | | | |
| Double wet rubs after 15 min. at room temp. | 1-2 | 3 | 10 | >100 |
| Double wet rubs after 50° C. for 2 min. | 3-4 | 25 | 80 | >100 |

TABLE 3-continued

| The Influence of PUD Selection on Ink and Print Properties | | | | |
|---|---|---|---|---|
| | Example | | | |
| | I14 | I15 | I16 | C3 |
| Double wet rubs after 75° C. for 2 min. | 80 | >100 | >100 | >100 |
| Double wet rubs after 100° C. for 2 min. | >100 | >100 | >100 | >100 |
| Double wet rubs after room temp. for 2 days | >100 | >100 | >100 | >100 |

Table 3 shows that the hydroxyl value of the PUD plays a significant role in enhancing the resolubility of the inks. The ink comprising the PUD with no or minimal hydroxyl functionality, Daotan 6450 (Comparative Example C3) proved to be insoluble in the resolubility test. Significantly improved resolubility was achieved as the hydroxyl value of the PUD increased to beyond 50 mgKOH/g, a specific feature of the invention.

The invention lends itself to the use of a wide range of self-crosslinking styrene-acrylic solutions and dispersions. Table 4 shows the results for a number of inks prepared according to the invention comprising various self-crosslinking styrene-acrylic dispersions.

The results provided in Table 4 show that inks having the desirable features of the invention can be prepared with a wide range of self-crosslinking styrene-acrylic dispersions. That such highly resistant prints can be achieved from inks which are resoluble is a significant advance for aqueous inkjet printing ink technology.

The invention is further described by the following numbered paragraphs:

1. An aqueous printing ink composition comprising a water soluble, or water dispersible, self-crosslinking polymer and a hydroxyl-functional polyurethane dispersion.

2. The composition of paragraph 1, wherein the number of double water rubs required to reach failure remove is ≤20, more preferably ≤15, most preferably ≤12, after 15 min. at room temperature, and the number of double

TABLE 4

| Ink Compositions Comprising Various Self-Crosslinking Acrylic Dispersions | | | | | | | | |
|---|---|---|---|---|---|---|---|---|
| | Example | | | | | | | |
| | I12 | I17 | I18 | I19 | I20 | I21 | I22 | I23 |
| Deionized Water | 13.7 | 13.7 | 13.7 | 13.7 | 13.7 | 13.7 | 13.7 | 13.7 |
| Propylene glycol | 25.0 | 25.0 | 25.0 | 25.0 | 25.0 | 25.0 | 25.0 | 25.0 |
| Tegowet KL245 | 0.2 | 0.2 | 0.2 | 0.2 | 0.2 | 0.2 | 0.2 | 0.2 |
| 2-Amino-2-methyl-1-propanol | 0.2 | 0.2 | 0.2 | 0.2 | 0.2 | 0.2 | 0.2 | 0.2 |
| P-PUD | 23.4 | 23.4 | 23.4 | 23.4 | 23.4 | 23.4 | 23.4 | 23.4 |
| Joncryl FLX5000 | 12.5 | — | — | — | — | — | — | — |
| Joncryl FLX5010 | — | 12.5 | — | — | — | — | — | — |
| Joncryl FLX5020 | — | — | 12.5 | — | — | — | — | — |
| Joncryl FLX5040 | — | — | — | 12.5 | — | — | — | — |
| Joncryl FLX5060 | — | — | — | — | 12.5 | — | — | — |
| Neocryl A1120 | — | — | — | — | — | 12.5 | — | — |
| Neocryl A1129 | — | — | — | — | — | — | 12.5 | — |
| Neocryl XK14 | — | — | — | — | — | — | — | 12.5 |
| Cyan Pigment Dispersion | 25.0 | 25.0 | 25.0 | 25.0 | 25.0 | 25.0 | 25.0 | 25.0 |
| Total | 100 | 100 | 100 | 100 | 100 | 100 | 100 | 100 |
| Viscosity Measurements | | | | | | | | |
| Viscosity at 32° C. (mPa · s) | 6.39 | 5.46 | 5.31 | 6.96 | 5.94 | 6.39 | 6.09 | 6.00 |
| Resolubility Assessment | | | | | | | | |
| Resolubility | Resoluble | Highly Resoluble | Partial | Resoluble | Highly Resoluble | Resoluble | Resoluble | Resoluble |
| Cure/Water Resistance Failure Mode of Prints (Double Wet Rubs) | | | | | | | | |
| Double wet rubs after 15 min. at room temp. | 3 | 2 | 6 | 2 | 2 | 2 | 2 | 3 |
| Double wet rubs after 50° C. for 2 min. | 4 | 3 | 10 | 5 | 4 | 3 | 3 | 4 |
| Double wet rubs after 75° C. for 2 min. | 35 | 7 | 70 | 40 | 35 | 25 | 16 | 25 |
| Double wet rubs after 100° C. for 2 min. | >100 | 60 | >100 | >100 | >100 | >100 | 60 | >100 |
| Double wet rubs after room temp. for 2 days | >100 | 90 | >100 | >100 | >100 | >100 | 55 | >100 | water rubs required to reach failure mode is ≥50 double rubs, more preferably ≥100 double rubs, after heating at 100° C. for 2 minutes or after storing at room temperature for 2 days.

3. The composition according to paragraph 1, wherein the self-crosslinking polymer comprises an acrylic copolymer or a styrene-acrylic copolymer.

4. The composition according to paragraph 1, wherein the self-crosslinking polymer comprises an aldehyde, ketone, carboxylic acid or organosilane.

5. The composition according to paragraph 4, wherein the self-crosslinking polymer is in the form of a dispersion or solution and further comprises a crosslinker selected from a multifunctional amine or a metal complex.

6. The composition according to any previous paragraph, wherein the hydroxyl-functional polyurethane dispersion has a hydroxyl value of 50 mgKOH/g, or greater, based on the dry weight of the polymer.

7. The composition according to any previous paragraph, which is suitable for printing via an inkjet printing process and has a viscosity of mPa·s, or less, at 32° C.

8. The composition according to any previous paragraph, wherein the initial viscosity increases ≤20% after 14 days at 50° C.

9. The composition according to any previous paragraph, wherein the initial viscosity increases ≤10% after 14 days at 50° C.

10. The composition according to any previous paragraph, wherein the initial viscosity increases ≤5% after 14 days at 50° C.

11. The composition according to any preceding paragraph which contains less than 30% (w/w) of any blend of organic water-soluble co-solvents having boiling points of greater than 150° C.

12. The composition according to paragraph 11, which contains less than 10% (w/w) of a water-soluble organic co-solvent with a boiling point in excess of 200° C.

13. The composition according to any previous paragraph, which further comprises an amine with a boiling point of greater than 130° C.

14. The composition according to paragraph 13, in which the amine has a boiling point of less than 200° C.

15. The ink composition according to paragraph 14, in which the amine is selected from the group consisting of N,N-dimethylethanolamine, N-methylethanolamine, N-methyldiethanolamine, 2-amino-2-methyl-1-propanol, ethanolamine.

16. The composition according to any previous paragraph, which further comprises a crosslinker selected from the group consisting of carbodiimide, oxazoline, aziridine, amino resin, a blocked isocyanate type and combinations thereof.

17. The composition according to any preceding paragraph which may be used in the printing of packaging, including food packaging, the printing of metal substrates, the printing of textiles, the printing of décor laminates and the printing of graphics.

18. A printed article comprising the composition of any one or more of paragraphs 1-17.

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention claimed is:

1. An aqueous printing ink composition comprising: an aqueous dispersion or solution of a self-crosslinking polymer, an aqueous dispersion of a hydroxyl-functional polyurethane, and at least one amine having a boiling point of above 130° C. and less than 250° C.; wherein the ratio of the self-crosslinking polymer, based on dry polymer weight, to OH-PUD, based on dry polymer weight, is in the range of 0.2:1.0 to 1.0:1.0; and wherein the self-crosslinking polymer is produced by a free radical polymerization of a blend of ethylenically unsaturated monomers.

2. The composition according to claim 1, wherein the self-crosslinking polymer comprises a self-crosslinking acrylic copolymer or a self-crosslinking styrene-acrylic copolymer.

3. The composition according to claim 1, wherein the self-crosslinking polymer comprises an aldehyde group, a ketone group, a carboxylic acid group, an organosilane group, or a combination thereof, attached to the polymer.

4. The composition according to claim 3, wherein the aqueous dispersion or solution of the self-crosslinking polymer and further comprises at least one crosslinker selected from a multifunctional amine and a metal complex.

5. The composition according to claim 1, wherein the aqueous dispersion of the hydroxyl-functional polyurethane has a hydroxyl value of 130 mgKOH/g or greater, based on the dry weight of the polymer.

6. The composition according to claim 1, which is suitable for printing via an inkjet printing process and has a viscosity of 10 mPa·s, or less, at 32° C., wherein the viscosity is measured with a viscometer equipped with a spindle no. 18 at 100 rpm.

7. The composition according to claim 1, which has an initial viscosity that increases ≤5% after 14 days at 50° C.

8. The composition according to claim 1, which contains 30% or less (w/w) of any blend of organic water-soluble co-solvents having boiling points of greater than 150° C.

9. The composition according to claim 8, which contains less than 10% (w/w) of a water-soluble organic co-solvent with a boiling point in excess of 200° C.

10. The composition according to claim 1, in which the at least one amine has a boiling point of above 130° C. and less than 200° C.

11. The ink composition according to claim 1, in which the at least one amine is selected from the group consisting of N,N-dimethylethanolamine, N-methylethanol amine, 2-amino-2-methyl-1-propanol, and ethanolamine.

12. The ink composition according to claim 1, in which the at least one amine is selected from the group consisting of N,N-dimethylethanolamine and 2-amino-2-methyl-1-propanol.

13. The composition according to claim 1, which further comprises at least one crosslinker selected from the group consisting of carbodiimide, oxazoline, aziridine, amino resin, and a blocked isocyanate type crosslinker.

14. The composition according to claim 1, further comprising a colorant; wherein the colorant comprises at least one organic and/or inorganic pigment, at least one dye, or a combination thereof.

15. The composition according to claim 14, wherein the at least one organic and/or inorganic pigment is selected from the group consisting of carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitroanilines, pyrazoles, diazopyranthrones, pyrazoles, dianisidines, pyranthrones, tetracholoroisoindolines, dioxazines, monoazoacrylides, and anthrapyrimidines.

16. The composition according to claim 14, wherein the at least one dye is selected from the group consisting of azo dyes, anthraquinone dyes, xanthene dyes, and azine dyes.

17. The composition of claim 1, which reaches failure mode with less than or equal to 20 double water rubs after 15 min. at room temperature, and which reaches failure mode with greater than or equal to 50 double water rubs after heating at 100° C. for 2 minutes or after storing at room temperature for 2 days.

18. The composition according to claim 1 which may be used in the printing of packaging, the printing of food packaging, the printing of metal substrates, the printing of textiles, the printing of decor laminates and the printing of graphics.

19. A printed article comprising the composition of claim 1.

20. A method of making a composition of claim 1, comprising combining the aqueous dispersion or solution of the self-crosslinking polymer, the aqueous dispersion of the hydroxyl-functional polyurethane, and the at least one amine, wherein the ratio of the self-crosslinking polymer, based on dry polymer weight, to OH-PUD, based on dry polymer weight, is in the range of 0.2:1.0 to 1.0:1.0.

21. The method of claim 20 wherein the self-crosslinking polymer comprises a self-crosslinking acrylic copolymer or a self-crosslinking styrene-acrylic copolymer; and wherein the at least one amine is added to the aqueous dispersion of the hydroxyl-functional polyurethane prior to combining the aqueous dispersion or solution of the self-crosslinking acrylic copolymer or self-crosslinking styrene-acrylic copolymer with the aqueous dispersion of the hydroxyl-functional polyurethane.

22. The method of claim 21, wherein the at least one amine is added to neutralise the self-crosslinking acrylic copolymer or self-crosslinking styrene-acrylic copolymer.

23. A method of printing comprising the steps of:
a) providing the composition claim 1; and
b) printing said composition onto a substrate.

24. The method of claim 23, wherein the method of printing is single pass inkjet printing.

25. The method of claim 23 wherein said method further comprises curing said printed composition at a temperature of no more than 100° C.

\* \* \* \* \*